US008495628B2

(12) United States Patent
Ben Yehuda et al.

(10) Patent No.: US 8,495,628 B2
(45) Date of Patent: Jul. 23, 2013

(54) PARA-VIRTUALIZATION IN A NESTED VIRTUALIZATION ENVIRONMENT USING REDUCED NUMBER OF NESTED VM EXITS

(75) Inventors: Shmuel Ben Yehuda, Haifa (IL); Orit Wasserman, Haifa (IL); Ben-Ami Yassour, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 12/545,834

(22) Filed: Aug. 23, 2009

(65) Prior Publication Data

US 2011/0047544 A1    Feb. 24, 2011

(51) Int. Cl.
*G06F 9/455* (2006.01)
*G06F 9/46* (2006.01)

(52) U.S. Cl.
USPC .............................................. 718/1; 718/108

(58) Field of Classification Search
None
See application file for complete search history.

(56) References Cited

U.S. PATENT DOCUMENTS

| | | | |
|---|---|---|---|
| 7,665,088 B1 * | 2/2010 | Bugnion et al. | 718/100 |
| 7,865,893 B1 * | 1/2011 | Omelyanchuk et al. | 718/1 |
| 2007/0028238 A1 * | 2/2007 | Bennett et al. | 718/1 |
| 2007/0050764 A1 * | 3/2007 | Traut | 718/1 |
| 2007/0157198 A1 | 7/2007 | Bennett et al. | |
| 2011/0047547 A1 * | 2/2011 | Bennett et al. | 718/1 |

FOREIGN PATENT DOCUMENTS

WO    WO2008002419    1/2008

OTHER PUBLICATIONS

Alan Murphy, "Nested Hypervisor (In) Security", Feb. 2008 thevirtualdc.com/?p=42.
Ben Armstrong, "Running Virtual PC under Hyper-V Beta", Jan. 2008 blogs.msdn.com/virtual_pc_guy/archive/2008/01/04/running-virtual-pc-under-hyper-v-beta.aspx.
Hypervisor—PCs and desktop systems en.wikipedia.org/wiki/Hypervisor.
Leendart van Doorn, "Hardware Virtualization Trends", research.ihost.com/vee/vee06/vandoorn.html.

* cited by examiner

*Primary Examiner* — Jennifer To
*Assistant Examiner* — Bing Zhao
(74) *Attorney, Agent, or Firm* — F. Jason Far-Hadian; Century IP Group

(57) ABSTRACT

A para-virtualization method is provided. The method comprises implementing a virtual machine (VM) for guest software running on first host software. In response to a privileged instruction, the guest software causes a first VM exit. If the first host software is not running directly on hardware, the privileged instruction is managed without causing a second VM exit. Otherwise, the privileged instruction is managed normally.

24 Claims, 9 Drawing Sheets

PARA-VIRTUALIZATION IN A NESTED VIRTUALIZATION ENVIRONMENT USING REDUCED NUMBER OF NESTED VM EXITS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The claimed subject matter relates generally to nested virtualization and, more particularly, to para-virtualization in a nested virtualization environment.

In a virtualization environment, a host software running on one or more hardware infrastructures may emulate the hardware for a guest software running on the host software. In other words, a hypervisor running on a physical machine may implement a virtual machine (VM) for a guest running on the hypervisor. That is, the VM may allow the guest to operate as if the guest were running directly on the physical machine.

Typically, the physical machine operates in a guest mode or a root mode. In the guest mode, the guest software manages execution of instructions by the physical machine. In the root mode, the hypervisor manages execution of instructions by the physical machine. The physical machine generally operates in the guest mode, but may switch to the root mode to execute a privileged instruction that requires support from the hypervisor to be compatible with the physical machine. Switching to the root mode is referred to as a VM exit, and switching back to the guest mode is referred to as a VM entry.

SUMMARY

The present disclosure is directed to systems and corresponding methods that facilitate para-virtualization in a nested virtualization environment.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a para-virtualization method is provided. The method comprises implementing a virtual machine (VM) for guest software running on first host software. In response to a privileged instruction, the guest software causes a first VM exit. If the first host software is not running directly on hardware, the privileged instruction is managed without causing a second VM exit. Otherwise, the privileged instruction is managed normally.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Para-virtualization refers to the ability of a guest software to communicate with a root hypervisor using one or more hypercalls provided in an application programming interface (API). As a result, some of the functionality provided by the root hypervisor may be provided by the guest instead.

In one or more embodiments, para-virtualization may be implemented for a nested hypervisor (i.e., a hypervisor running as a guest on another hypervisor) and a root hypervisor. In one implementation, if a guest running on the nested hypervisor causes a VM exit due to a privileged instruction, the nested hypervisor may manage the privileged instruction without causing another VM exit. Depending on the level of nesting, such an implementation may reduce the number of VM exits several orders of magnitude. Since each VM exit is associated with an overheard cost, the reduction of VM exits may significantly improve performance.

Figure 1:
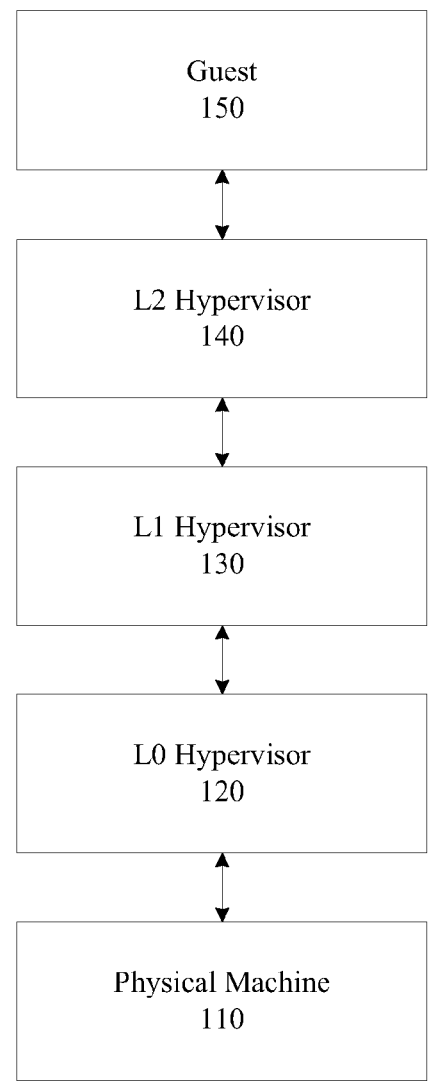
FIG. 1 illustrates an exemplary nested virtualization environment, in accordance with one or more embodiments.

Referring to FIG. 1, in accordance with one or more embodiments, para-virtualization may be implemented in an exemplary nested virtualization environment 100 comprising a physical machine 110 and a level 0 (L0), or root, hypervisor 120, and one or more higher-level, or nested, hypervisors. The level 1 (L0) hypervisor 120 runs on the physical machine 110, and one or more guests run on the L0 hypervisor 120 and each of the higher-level hypervisors. For example, the guest 150 runs as a guest on the level 2 (L2) hypervisor 140; the L2 hypervisor 140 runs as a guest on the level 1 (L1) hypervisor 130; and the L1 hypervisor 130 runs as a guest on the L0 hypervisor 120.

Figure 2:
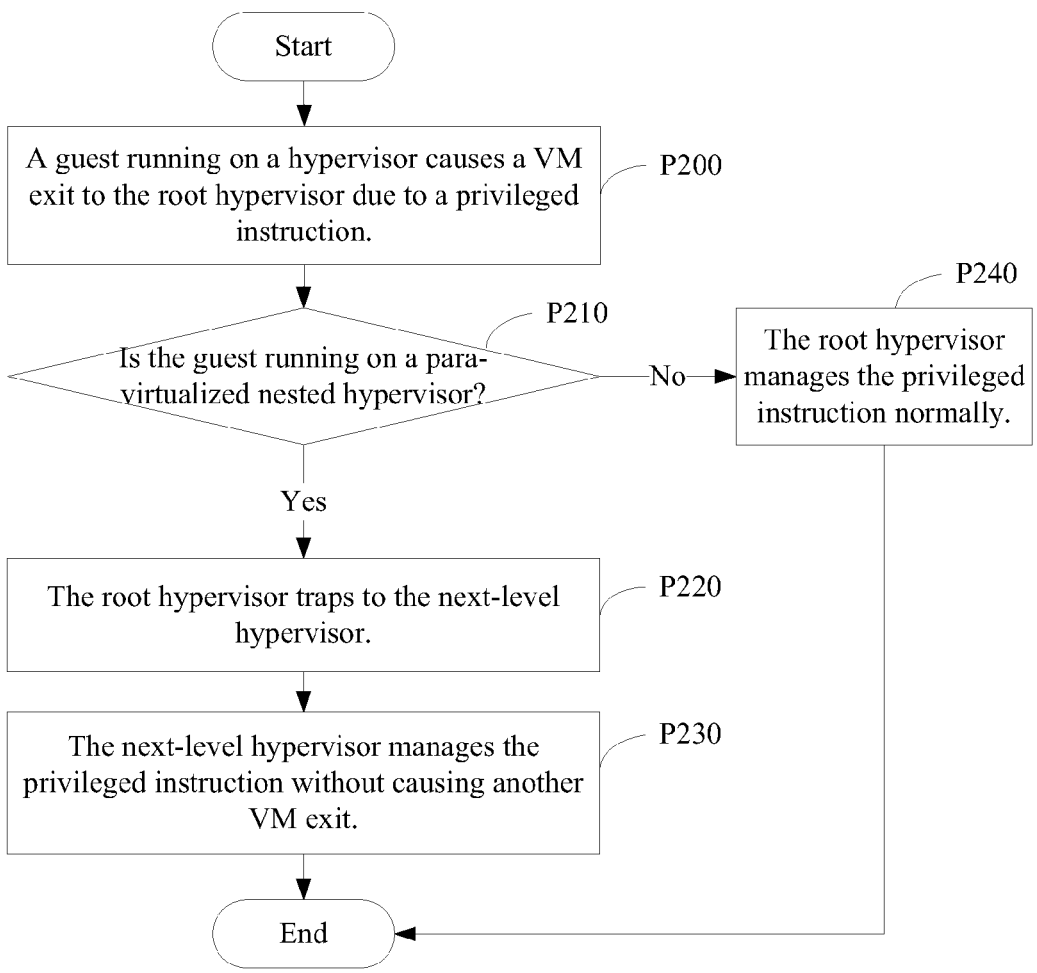
FIG. 2 is a flow diagram of a method for managing a privileged instruction, in accordance with one embodiment.

Referring to FIGS. 1 and 2, in accordance with one or more embodiments, a guest running on a hypervisor causes a VM exit to the root hypervisor (e.g., the L0 hypervisor 120) due to a privileged instruction (P200).

If the guest is running on a para-virtualized nested hypervisor (e.g., the L1 hypervisor 130 or the L2 hypervisor 140) (P210), the root hypervisor traps to the next-level hypervisor (e.g., the L1 hypervisor 130) (P220). In other words, the root hypervisor throws an exception and transfers control to the next-level hypervisor to handle the exception. The next-level hypervisor manages the privileged instruction without causing another VM exit (P230). If the guest is running on the root hypervisor, the root hypervisor manages the privileged instruction normally (P240). It is noteworthy that the root hypervisor may mark para-virtualized nested hypervisors on startup, as provided in more detail below.

Figure 3:
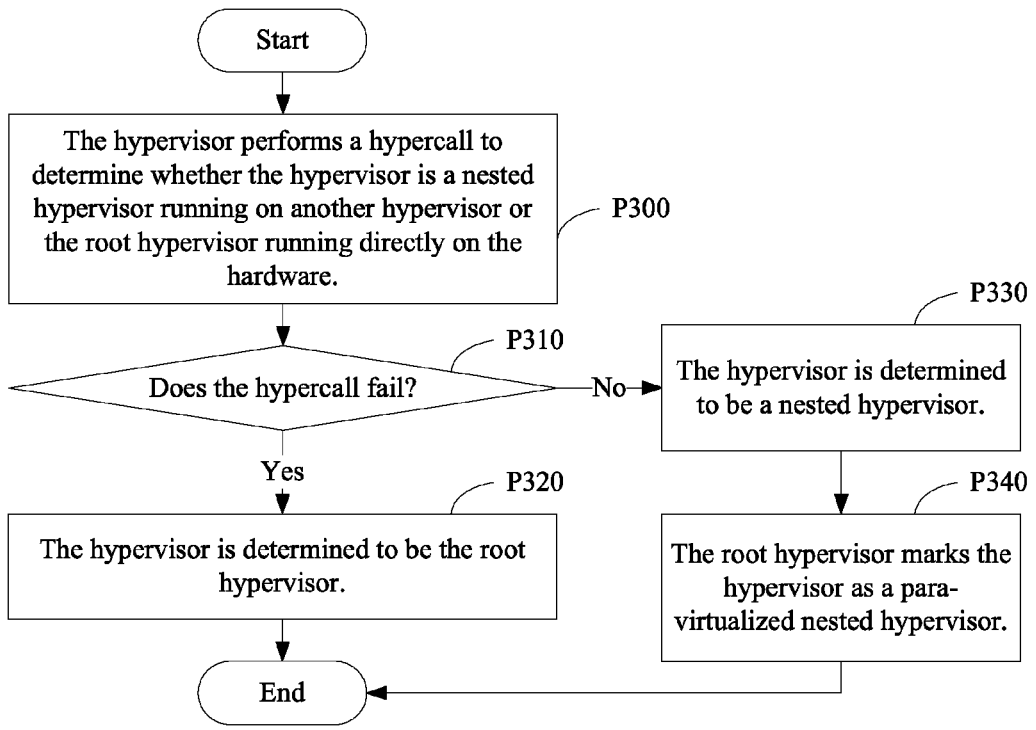
FIG. 3 is a flow diagram of a first method for determining whether a hypervisor is a nested hypervisor.

Referring to FIGS. 2 and 3, in accordance with one embodiment, on startup or at some other point in time, a hypervisor performs a hypercall to determine whether the hypervisor is a nested hypervisor running on another hypervisor or the root hypervisor running directly on the hardware (P300). The hypercall may be described in an API. If the hypercall fails (P310), the hypervisor is determined to be the root hypervisor (P320). Otherwise, the hypervisor is determined to be a nested hypervisor (P330) and the hypervisor is marked as a para-virtualized nested hypervisor by the root hypervisor (P340).

Figure 4:
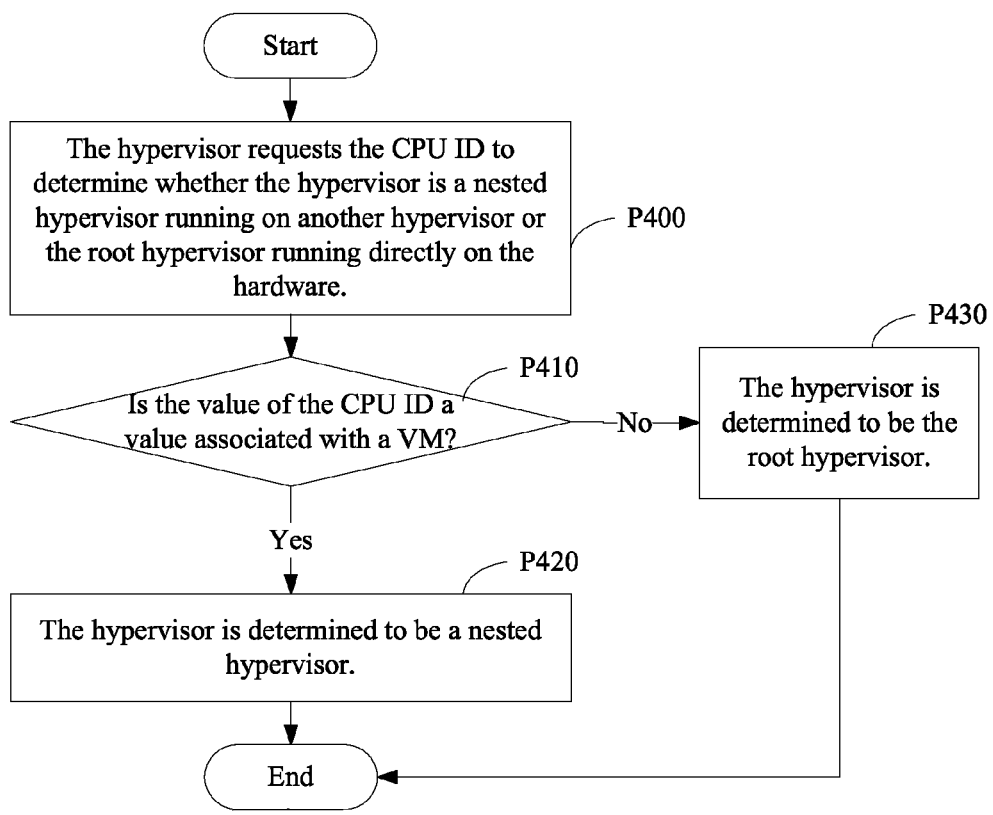
FIG. 4 is a flow diagram of a second method for determining whether a hypervisor is a nested hypervisor.

Referring to FIGS. 2 and 4, in accordance with one embodiment, on startup or at some other point in time, the hypervisor requests an identification (ID) of the underlying hardware (e.g., performs a CPU_ID command) to determine whether the hypervisor is a nested hypervisor running on another hypervisor or the root hypervisor running directly on hardware (P400). If the value of returned by the ID request is a value associated with a VM (P410), the hypervisor is determined to be a nested hypervisor (P420). Otherwise, the hypervisor is determined to be the root hypervisor (P430).

A para-virtualization implementation is provided below for enabling a nested hypervisor to manage privileged instructions in an Intel VT-x virtualization environment. It should be understood, however, that such an implementation is provided for purposes of example to illustrate the processes described above. In other implementations, para-virtualization may be implemented for different types of privileged instructions in different types of virtualization environments, without limitation.

Figure 5:
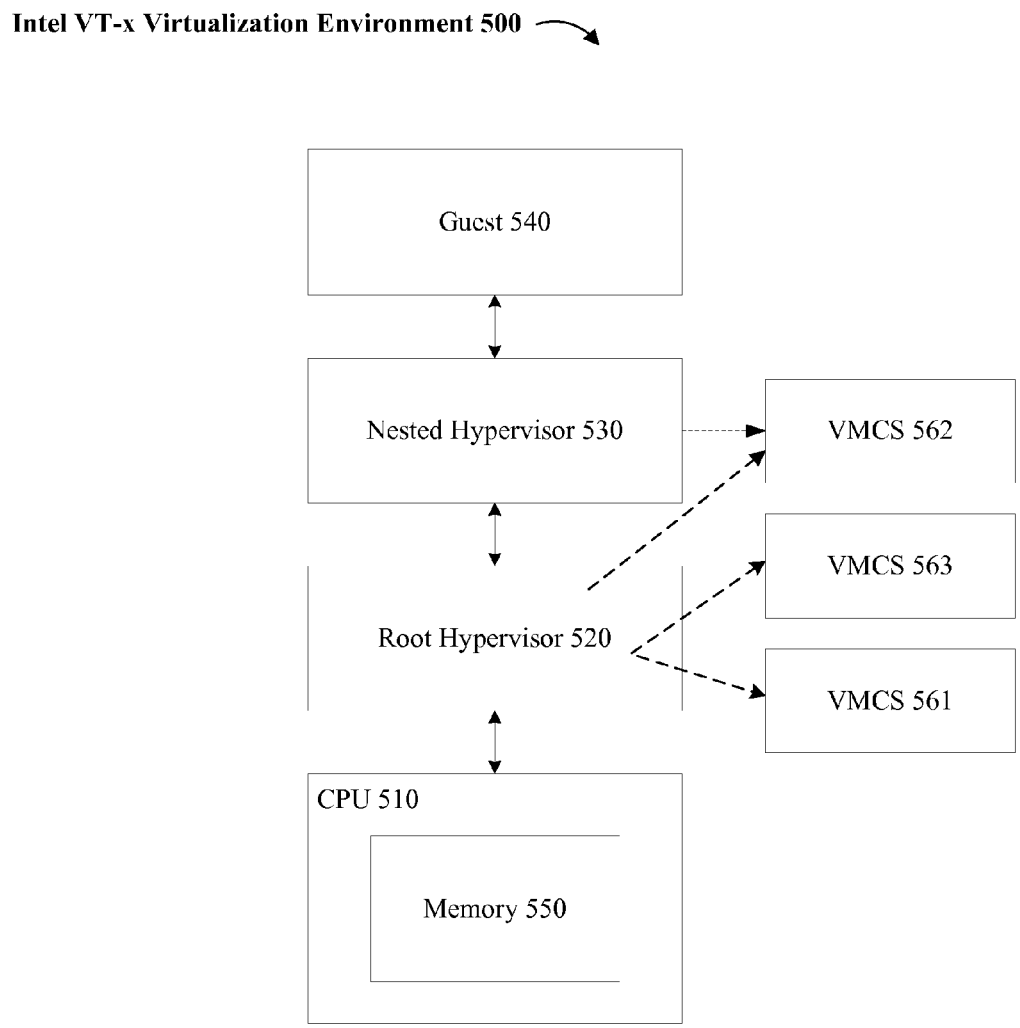
FIG. 5 illustrates an exemplary nested virtualization environment, in accordance with one embodiment.

Referring to FIG. 5, in accordance with one or more embodiments, an exemplary virtualization environment 500 (e.g., Intel VT-x) comprises a CPU 510, a root hypervisor 520, a nested hypervisor 530, a guest 540, and a memory 550. The guest 540 is a guest that runs on the nested hypervisor 530, and the nested hypervisor 530 is a guest that runs on the root hypervisor 520.

Figure 6:
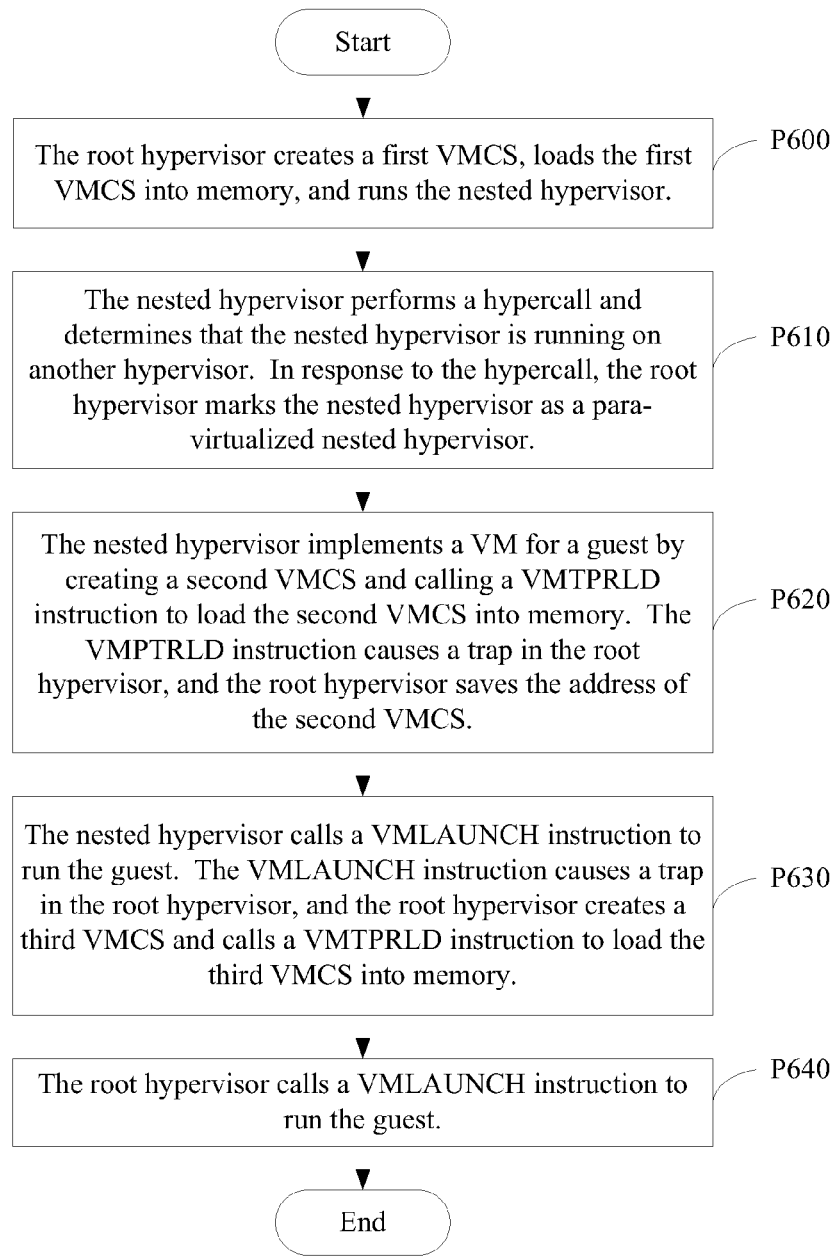
FIG. 6 is a flow diagram of a method for initializing a nested para-virtualization environment, in accordance with one embodiment.

Referring to FIGS. 5 and 6, in accordance with one embodiment, the root hypervisor 520 implements a VM for the nested hypervisor 530 by creating a VM control structure (VMCS) 561 and loading the VMCS 561 into the memory 550. The root hypervisor 520 also runs the nested hypervisor 530 (P600). On startup, the nested hypervisor 530 performs a hypercall and determines that the nested hypervisor 530 is running on another hypervisor. In response to the hypercall, the root hypervisor 520 marks the nested hypervisor 530 as a para-virtualized nested hypervisor (P610).

The nested hypervisor 530 implements a VM for the guest 540 by creating a VMCS 562 and calling a VMTPRLD instruction to load the VMCS 562 into the memory 550. The VMTPRLD instruction causes a trap to the root hypervisor 520, and the root hypervisor 520 saves the address of the VMCS 562 (P620). In other words, the nested hypervisor 530 throws an exception and transfers control to the root hypervisor 520 to handle the exception.

Once the VMCS 562 is loaded into the memory 550, the nested hypervisor 530 calls a VMLAUNCH instruction to run the guest 540. The VMLAUNCH instruction causes a trap to the root hypervisor 520, and the root hypervisor 520 creates a VMCS 563 and calls a VMTPRLD instruction to load the VMCS 563 into the memory 550 (P630). The root hypervisor 520 also calls a VMLAUNCH instruction to run the guest 540 (P640).

Figure 7:
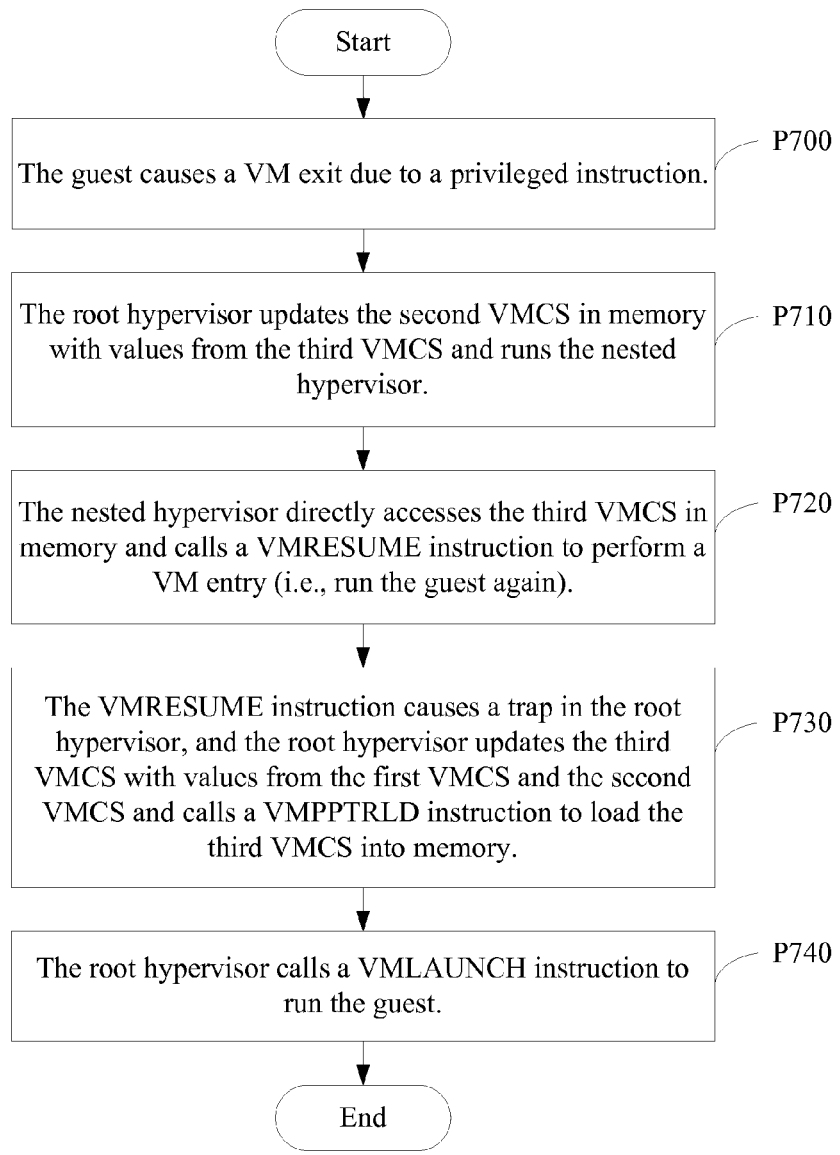
FIG. 7 is a flow diagram of a method for managing a privileged instruction, in accordance with one embodiment.

Referring to FIGS. 5 through 7, in accordance with one embodiment, the guest 540 causes a VM exit due to a privileged instruction (e.g., VMREAD or VMWRITE) (P700). In response to the VM exit, the root hypervisor 520 updates the VMCS 562 in the memory 550 with values from the VMCS 563 and runs the nested hypervisor (P710).

The nested hypervisor 530 reads from or writes to the VMCS 562 in the memory 550 (e.g., depending on whether the privileged instruction is a VMREAD or a VMWRITE instruction, respectively). In other words, the nested hypervisor 530 directly accesses the VMCS 562 (e.g., instead of calling the VMREAD or VMWRITE instruction again to access the VMCS 562 and causing another VM exit). Once the memory access is completed, the nested hypervisor 530 calls a VMRESUME instruction to perform a VM entry (i.e., run the guest 540 again) (P730).

The VMRESUME instruction causes a trap to the root hypervisor 520, and the root hypervisor 520 updates the VMCS 563 with values from the VMCS 561 and the VMCS 562. The root hypervisor 520 also calls a VMPTRLD instruction to load the VMCS 563 into the memory 550 (P730) and calls a VMLAUNCH instruction to run the guest 540 (P740).

Alternatively, instead of directly accessing the VMCS 562 in the memory 550, the nested hypervisor 530 may perform a hypercall that batches several privileged instructions (e.g., VMREADs and VMWRITEs) to reduce the number of VM exits.

In different embodiments, the claimed subject matter may be implemented either entirely in the form of hardware or entirely in the form of software, or a combination of both hardware and software elements. For example, a nested virtualization environment may comprise a controlled computing system environment that may be presented largely in terms of hardware components and software code executed to perform processes that achieve the results contemplated by the system of the claimed subject matter.

Figure 8:
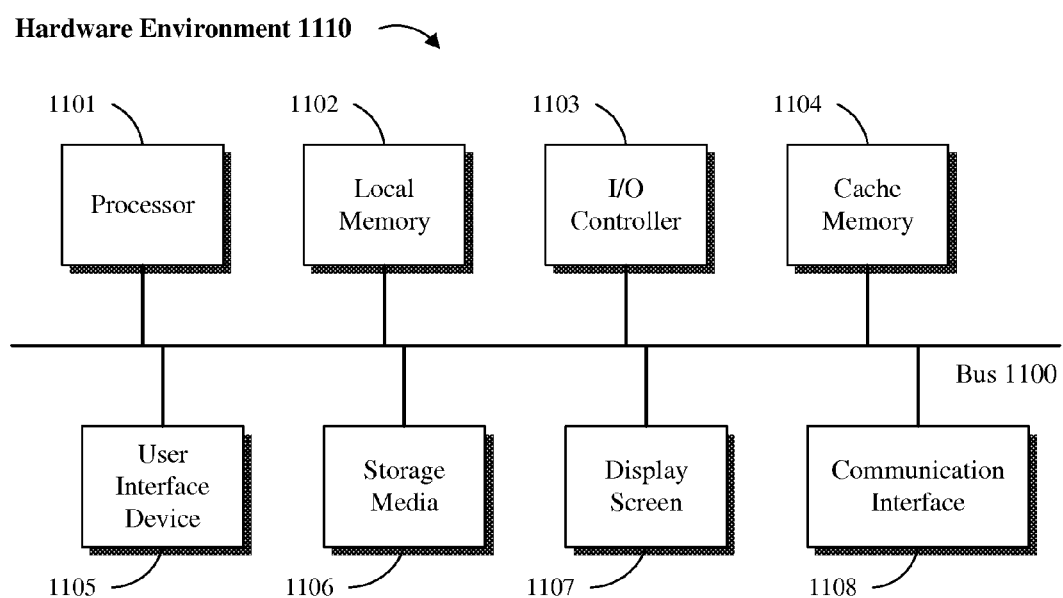
FIGS. 8 and 9 are block diagrams of hardware and software environments in which a system of the present invention may operate, in accordance with one or more embodiments.
Figure 9:
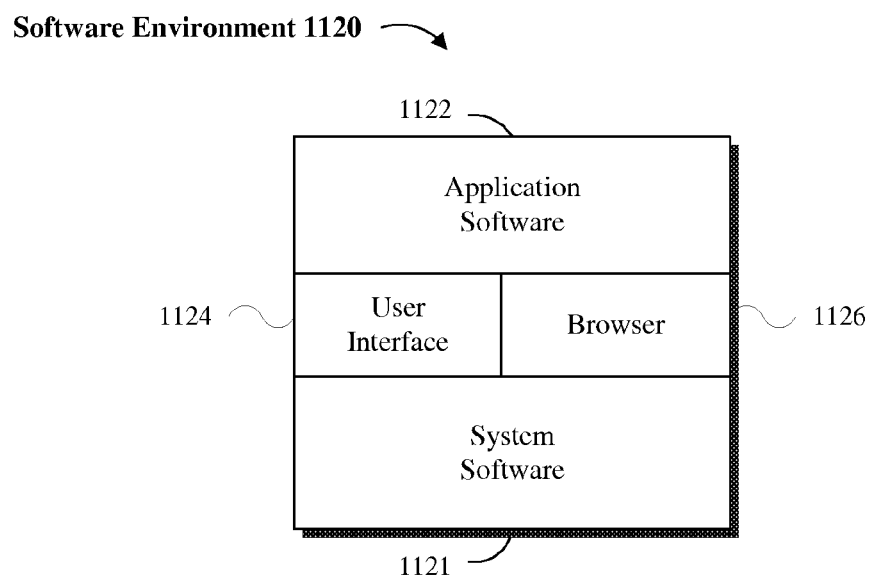

Referring to FIGS. 8 and 9, a computing system environment in accordance with an exemplary embodiment is composed of a hardware environment 1110 and a software environment 1120. The hardware environment 1110 comprises the machinery and equipment that provide an execution environment for the software; and the software environment 1120 provides the execution instructions for the hardware as provided below.

As provided here, software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, a hypervisor may be implemented as system software 1121 or application software 1122 executed on one or more software or hardware environments to facilitate para-virtualization in a nested virtualization environment.

System software 1121 may comprise control programs, such as the operating system (OS) and information management systems that instruct the hardware how to function and process information. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 8, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 9, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a personal computing system (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A para-virtualization method comprising:

implementing a virtual machine (VM) for guest software running on first host software, wherein the guest software causes a first VM exit to the first host software from the guest software, due to a privileged instruction;

determining whether the first host software is running directly on hardware having a processor and a memory by way of the first host software submitting a request for hardware identity information during a startup process, wherein the identity information indicates if the first host software is running directly on the hardware or on a second host software; and managing the privileged instruction without causing a second VM exit to the second host software from the first host software, in response to determining that the first host software is executed over the second host software that is running directly on the hardware, wherein the second host software loads a first control structure into the memory, in response to determining that the first host software is running on the second host software, wherein the first host software loads a second control structure into the memory, in response to determining that the guest software is running on the first host software, and wherein the second host software loads a third control structure into the memory and updates value of the second control structure with value stored in the third control structure, in response to the first VM exit caused by the guest software due to the privileged instruction, wherein the address of the second control structure in the memory is known to the second host software such that control for handling the privileged instruction is transferred to the first host software and so that the first host software directly accesses the second control structure instead of having the second host software access the second control structure, since the value of the second control structure has been previously updated with the value stored in the third control structure.

2. The method of claim 1, wherein the determining comprises performing a hypercall.

3. The method of claim 2, wherein the first host software is determined to be running directly on the hardware, in response to failure of the hypercall.

4. The method of claim 3, wherein the first host software is determined to be running on a second host software, in response to success of the hypercall.

5. The method of claim 4, wherein the first host software is marked as a para-virtualized nested host software.

6. The method of claim 1, wherein the determining comprises requesting an identification of underlying hardware.

7. The method of claim 6, wherein the first host software is determined to be running on a second host software, in response to the identification being a value associated with a VM.

8. The method of claim 7, wherein the first host software is determined to be running directly on the hardware, in response to the identification not being a value associated with a VM.

9. A system having processors comprising:

a logic unit for implementing a virtual machine (VM) for guest software running on first host software, wherein the guest software causes a first VM exit to the first host software from the guest software, due to a privileged instruction;

a logic unit for determining whether the first host software is running directly on hardware having a processor and a memory by way of the first host software submitting a request for hardware identity information during a startup process, wherein the identity information indicates if the first host software is running directly on the hardware or on a second host software; and a logic unit for managing the privileged instruction without causing a second VM exit to the second host software from the first host software, in response to determining that the first host software is executed over the second host software that is running directly on the hardware, wherein the second host software loads a first control structure into the memory, in response to determining that the first host software is running on the second host software, wherein the first host software loads a second control structure into the memory, in response to determining that the guest software is running on the first host software, and wherein the second host software loads a third control structure into the memory and updates value of the second control structure with value stored in the third control structure, in response to the first VM exit caused by the guest software due to the privileged instruction, wherein the address of the second control structure in the memory is known to the second host software such that control for handling the privileged instruction is transferred to the first host software and so that the first host software directly accesses the second control structure instead of having the second host software access the second control structure, since the value of the second control structure has been previously updated with the value stored in the third control structure.

10. The method of claim 9, wherein the determining comprises performing a hypercall.

11. The method of claim 10, wherein the first host software is determined to be running directly on the hardware, in response to failure of the hypercall.

12. The method of claim 11, wherein the first host software is determined to be running on a second host software, in response to success of the hypercall.

13. The method of claim 12, wherein the first host software is marked as a para-virtualized nested host software.

14. The method of claim 9, wherein the determining comprises requesting an identification of underlying hardware.

15. The method of claim 14, wherein the first host software is determined to be running on a second host software, in response to the identification being a value associated with a VM.

16. The method of claim 15, wherein the first host software is determined to be running directly on the hardware, in response to the identification not being a value associated with a VM.

17. A computer program product comprising a non-transitory data storage medium having logic code stored thereon, wherein the logic code when executed on a computer causes the computer to:

implement a virtual machine (VM) for guest software running on first host software, wherein the guest software causes a first VM exit to the first host software from the guest software, due to a privileged instruction;

determine whether the first host software is running directly on hardware having a processor and a memory by way of the first host software submitting a request for hardware identity information during a startup process, wherein the identity information indicates if the first host software is running directly on the hardware or on a second host software; and manage the privileged instruction without causing a second VM exit to the second host software from the first host software, in response to determining that the first host software is executed over the second host software that is running directly on the hardware, wherein the second host software loads a first control structure into the memory, in response to determining that the first host software is running on the second host software, wherein the first host software loads a second control structure into the memory, in response to determining that the guest software is running on the first host software, and wherein the second host software loads a third control structure into the memory and updates value of the second control structure with value stored in the third control structure, in response to the first VM exit caused by the guest software due to the privileged instruction, wherein the address of the second control structure in the memory is known to the second host software such that control for handling the privileged instruction is transferred to the first host software and so that the first host software directly accesses the second control structure instead of having the second host software access the second control structure, since the value of the second control structure has been previously updated with the value stored in the third control structure.

18. The method of claim 17, wherein the determining comprises performing a hypercall.

19. The method of claim 18, wherein the first host software is determined to be running directly on the hardware, in response to failure of the hypercall.

20. The method of claim 19, wherein the first host software is determined to be running on a second host software, in response to success of the hypercall.

21. The method of claim 20, wherein the first host software is marked as a para-virtualized nested host software.

22. The method of claim 17, wherein the determining comprises requesting an identification of underlying hardware.

23. The method of claim 22, wherein the first host software is determined to be running on a second host software, in response to the identification being a value associated with a VM.

24. The method of claim 23, wherein the first host software is determined to be running directly on the hardware, in response to the identification not being a value associated with a VM.

* * * * *